No. 709,432. Patented Sept. 16, 1902.
W. D. BAKER.
PROCESS OF PRESERVING FOOD PRODUCTS.
(Application filed Apr. 16, 1901.)
(No Model.)
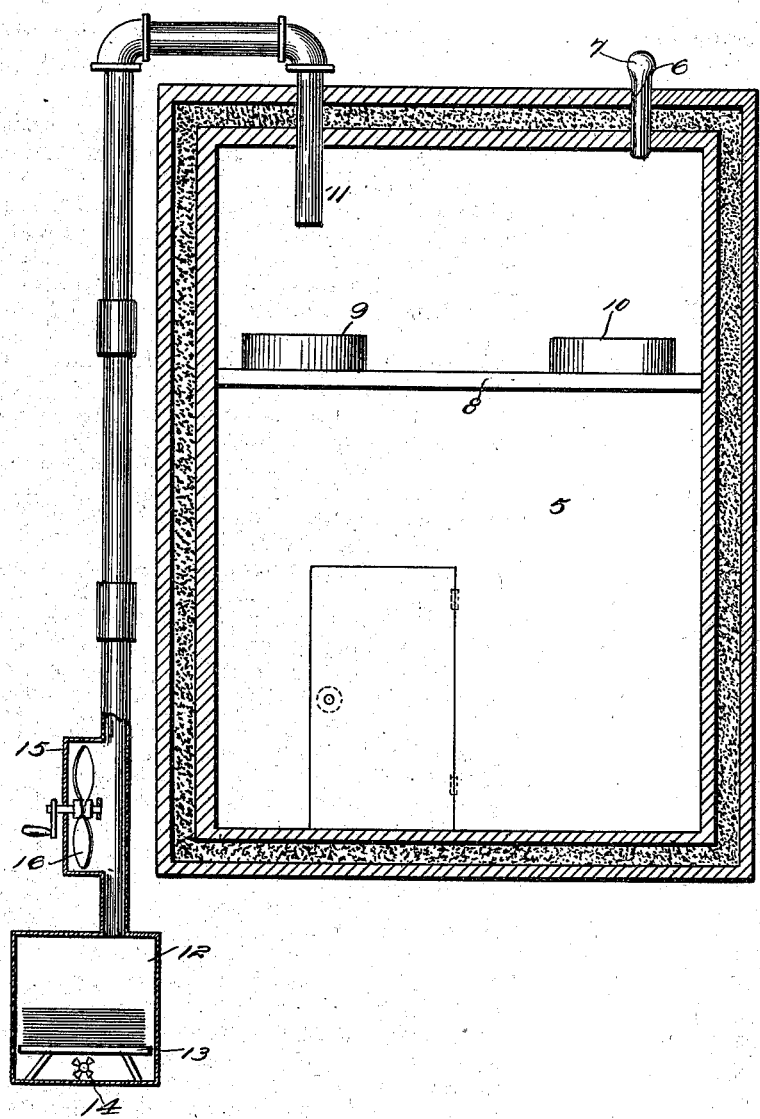

UNITED STATES PATENT OFFICE.

WILLARD D. BAKER, OF ROGERS, ARKANSAS, ASSIGNOR TO E. B. HARRINGTON, TRUSTEE, OF KANSAS CITY, MISSOURI.

PROCESS OF PRESERVING FOOD PRODUCTS.

SPECIFICATION forming part of Letters Patent No. 709,432, dated September 16, 1902.

Application filed April 16, 1901. Serial No. 56,107. (No specimens.)

*To all whom it may concern:*

Be it known that I, WILLARD D. BAKER, a citizen of the United States, residing at Rogers, in the county of Benton and State of Arkansas, have invented a new and useful Process of Preserving Food Products, of which the following is a specification.

This invention relates to the preservation of food products.

The object of the invention is in a simple, feasible, and at once practical manner and without the employment of a refrigerant to effect prolonged preservation of food materials.

With these and other objects in view, as will appear as the nature of the invention is better understood, the same consists in the novel process of preserving or treating fruit and other food products, as will be hereinafter fully described and claimed.

In the accompanying drawing, forming a part of this specification, and in which like numerals of reference indicate corresponding parts, there is illustrated somewhat in the nature of a diagram a chamber or space provided with means for effecting preservation of food materials, and in the drawing the figure is a view in sectional elevation of a chamber and adjunctive mechanism associated therewith for carrying out the process hereinafter described.

Referring to the drawing, 5 designates a chamber constructed in such manner and of such material as to render it practically heat and frost proof and which may consist of an inner and an outer casing having an intervening filling of charcoal or other suitable lagging material and provided at its top with a ventilator 6, provided with a closure 7. In the upper portion of the chamber is arranged a transverse shelf 8, on which are disposed pans 9 and 10, the pan 10 being disposed below the ventilator and the pan 9 below the discharge end of the inlet-pipe 11, which enters through the top of the chamber and communicates at its lower end with the combustion-chamber in the form of a metallic box 12, provided with a grate 13, below which is arranged a draft-opening provided with a suitable closure 14. The pipe 11 includes a fan-chamber 15, in which is arranged a fan 16, adapted upon rotation to create a draft upward through the pipe 11 and into the chamber 5.

Upon the grate in the combustion-chamber are placed any desired number of sheets 17 of blotting-paper or other absorbent material composed of wood fiber which has been saturated with a solution of equal parts, by weight, of potassium nitrate and boiling water, the material being dried by slow evaporation.

The pan 9 is to contain potassium carbonate and the pan 10 charcoal. In determining the quantity of the above materials to be used the cubic capacity of the chamber will be ascertained, and assuming it to be eighteen hundred cubic feet the quantity of potassium carbonate employed will be twenty-five pounds and of the charcoal four bushels, this latter having been previously dried by being subjected to a heat of about 180° Fahrenheit to drive off all gases and any contained moisture and then cooled without permitting access of air thereto, this being effected by providing the vessel containing the charcoal with a suitable cover, which is kept thereon until the charcoal is to be used.

In carrying out the process the fruit or other products to be treated having been placed in the chamber the cover is removed from the vessel containing the charcoal and the door of the chamber is tightly closed, the ventilator being left open. The blotting-paper, which will form a percentage of creosote on burning, is then ignited and is permitted to smolder, but not to blaze, and, if neccessary, the fan is operated to carry the products of combustion into the chamber until the air normally contained therein has been driven out, after which the ventilator is closed, the air dissipated being thus replaced by gases evolved from the burning paper, and consisting of nitrogen, carbonic-acid gas, a percentage of creosote, and possibly a percentage of fresh oxygen produced from the potassium nitrate. Potassium carbonate being hygroscopic in character readily absorbs all of the moisture contained in the gases, while the charcoal takes up all ill-smelling gases.

Fruits treated by this process are capable of being exposed for lengthy periods of time to the atmosphere without appreciable deterioration and readily withstand the tendency to rapid decay attendant upon transportation.

The claims herein are specific to the process set forth, broad claims on the method common to this application, and to application Serial No. 56,106 being embodied in my contemporaneous application, Serial No. 120,649, filed August 22, 1902.

Having thus fully described my invention, what I claim as new, and desire to secure by Letters Patent, is—

1. The process of preserving food products which consists in subjecting them to the products of combustion of paper impregnated with potassium nitrate.

2. The process of preserving food products which consists in subjecting them to the products of combustion of paper impregnated with potassium nitrate, in the presence of an absorbent for gases and an absorbent for moisture.

3. The process of preserving food products which consists in confining them in a chamber charged with the fumes of burning paper having potassium nitrate associated therewith, in the presence of potassium carbonate to absorb the moisture of the atmosphere of the chamber, and of charcoal to take up ill-smelling gases.

4. The process of preserving food products which consists in confining them in an atmosphere charged with carbonic-acid gas, a percentage of the principles of creosote and of fresh oxygen, produced by the combustion of paper impregnated with potassium nitrate, in the presence of an absorbent for moisture.

5. The process of preserving food products which consists in confining them in an atmosphere charged with carbonic-acid gas, nitrogen, a percentage of the principles of creosote and of fresh oxygen produced by the combustion of paper impregnated with potassium nitrate.

6. The process of preserving food products which consists in confining them in an atmosphere charged with the fumes of burning paper having potassium nitrate associated therewith, in the presence of potassium carbonate to absorb the moisture from the atmosphere.

7. The process of preserving food products which consists in confining them in an atmosphere charged with carbonic-acid gas, nitrogen, and a percentage of the principles of creosote, produced by the combustion of paper impregnated with potassium nitrate, in the presence of an absorbent for ill-smelling gases.

8. The process of preserving food products which consists in confining them in an atmosphere charged with carbonic-acid gas, nitrogen, a percentage of the principles of creosote and a percentage of fresh oxygen, produced by the combustion of paper impregnated with potassium nitrate, in the presence of an absorbent for moisture and an absorbent for ill-smelling gases.

In testimony that I claim the foregoing as my own I have hereto affixed my signature in the presence of two witnesses.

WILLARD D. BAKER.

Witnesses:
ANDREW E. CRAVER,
DAVID C. LANE.